United States Patent
Papasakellariou et al.

(10) Patent No.: US 8,842,700 B2
(45) Date of Patent: Sep. 23, 2014

(54) TRANSMISSION OF SOUNDING REFERENCE SIGNALS FROM A USER EQUIPMENT IN RESPONSE TO MULTIPLE REQUESTS

(75) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 321 days.

(21) Appl. No.: 13/463,233

(22) Filed: May 3, 2012

(65) Prior Publication Data

US 2012/0281604 A1    Nov. 8, 2012

Related U.S. Application Data (60) Provisional application No. 61/482,004, filed on May 3, 2011.

(51) Int. Cl.
| | | |
|---|---|---|
| H04B 3/10 | (2006.01) | |
| H04J 3/14 | (2006.01) | |
| H04L 27/26 | (2006.01) | |
| H04L 5/00 | (2006.01) | |

(52) U.S. Cl.
CPC ........ *H04L 27/2611* (2013.01); *H04L 27/2613* (2013.01); *H04L 5/0048* (2013.01)
USPC ........ 370/500; 370/330; 370/343; 370/395.3; 370/470

(58) Field of Classification Search
CPC ............ H04L 25/0202; H04L 25/0224; H04L 25/0226; H04L 25/0228; H04L 27/2613
USPC ................... 370/500, 330, 343, 384, 395.3, 370/470–472, 476
See application file for complete search history.

(56) References Cited

U.S. PATENT DOCUMENTS

| | | | |
|---|---|---|---|
| 2011/0199944 A1* | 8/2011 | Chen et al. | 370/280 |
| 2012/0281604 A1* | 11/2012 | Papasakellariou et al. | 370/310 |
| 2013/0077571 A1* | 3/2013 | Papasakellariou et al. | 370/328 |
| 2013/0195041 A1* | 8/2013 | Papasakellariou et al. | 370/329 |

OTHER PUBLICATIONS

Alcatel-Lucent Shanghai Bell, "Configuration for Dynamic Aperiodic SRS Triggering", R1-105995, 3GPP TSG RAN WG1 Meeting #63, Nov. 15, 2010.
Ericsson, ST-Ericsson, "Remaining Details on SRS Transmission", R1-110641, 3GPP TSG RAN WG1 Meeting #64, Feb. 21, 2011.
Samsung, "Aperiodic SRS Multiplexing", R1-106045, 3GPP TSG RAN WG1 #63, Nov. 15, 2010.

* cited by examiner

*Primary Examiner* — Benjamin H Elliott, IV
(74) *Attorney, Agent, or Firm* — The Farrell Law Firm, P.C.

(57) ABSTRACT

Methods and apparatus are provided for a User Equipment (UE) to transmit a Sounding Reference Signal (SRS). A first Downlink Control Information (DCI) format with an aperiodic SRS request field indicating aperiodic SRS transmission with first values for aperiodic SRS transmission parameters, is received. A second DCI format with an aperiodic SRS request field indicating aperiodic SRS transmission with second values for the aperiodic SRS transmission parameters, is received. The first values for the aperiodic SRS transmission parameters are compared with the second values for the aperiodic SRS transmission parameters. An aperiodic SRS is transmitted when the first values are identical to the second values. Transmission of the aperiodic SRS is suspended when the first values are not identical to the second values.

16 Claims, 9 Drawing Sheets

TRANSMISSION OF SOUNDING REFERENCE SIGNALS FROM A USER EQUIPMENT IN RESPONSE TO MULTIPLE REQUESTS

PRIORITY

The present application claims priority under 35 U.S.C. §119(e) to U.S. Provisional Application No. 61/482,004, which was filed in the United States Patent and Trademark Office on May 3, 2011, the entire disclosure of which is incorporated herein by reference.

BACKGROUND OF THE INVENTION

1. Field of the Invention

The present invention relates generally to wireless communication systems and, more particularly, to the transmission of sounding reference signals in an uplink of a communication system.

2. Description of the Art

A communication system includes a DownLink (DL) that conveys transmission signals from a Base Station (BS), or NodeB, to User Equipments (UEs). The communication system also includes an UpLink (UL) that conveys transmission signals from UEs to the NodeB. A UE, which is also commonly referred to as a terminal or a mobile station, may be fixed or mobile and may be embodied as a wireless device, a cellular phone, or a personal computer device. A NodeB is generally a fixed station and may also be referred to as an access point or other equivalent terminology.

A UL conveys transmissions of data signals carrying information content, of control signals providing control information associated with transmissions of data signals in a DL, and of Reference Signals (RSs), which are commonly referred to as pilot signals. A DL also conveys transmissions of data signals, control signals, and RSs. UL signals may be transmitted over clusters of contiguous REs using a Discrete Fourier Transform (DFT) Spread Orthogonal Frequency Division Multiplexing (DFT-S-OFDM) method. DL signals may be transmitted using an OFDM method.

UL data signals are conveyed through a Physical Uplink Shared CHannel (PUSCH) and DL data signals are conveyed through a Physical Downlink Shared CHannel (PDSCH).

In the absence of a PUSCH transmission, a UE conveys UL Control Information (UCI) through a Physical Uplink Control CHannel (PUCCH). However, when there is a PUSCH transmission, a UE may convey UCI together with data through the PUSCH.

DL control signals may be broadcast or sent in a UE-specific nature. Accordingly, UE-specific control channels can be used, among other purposes, to provide UEs with Scheduling Assignments (SAs) for PDSCH reception (DL SAs) or PUSCH transmission (UL SAs). The SAs are transmitted from the NodeB to respective UEs using DL Control Information (DCI) formats through respective Physical DL Control CHannels (PDCCHs).

A UE transmits an RS to either enable a NodeB to perform coherent demodulation of transmitted data or control signals, or to obtain measurements for a UL channel medium the UE experiences. An RS used for De-Modulation is referred to as a DM RS while an RS used for measurements of a UL channel medium is referred to as a Sounding RS (SRS).

Figure 1:
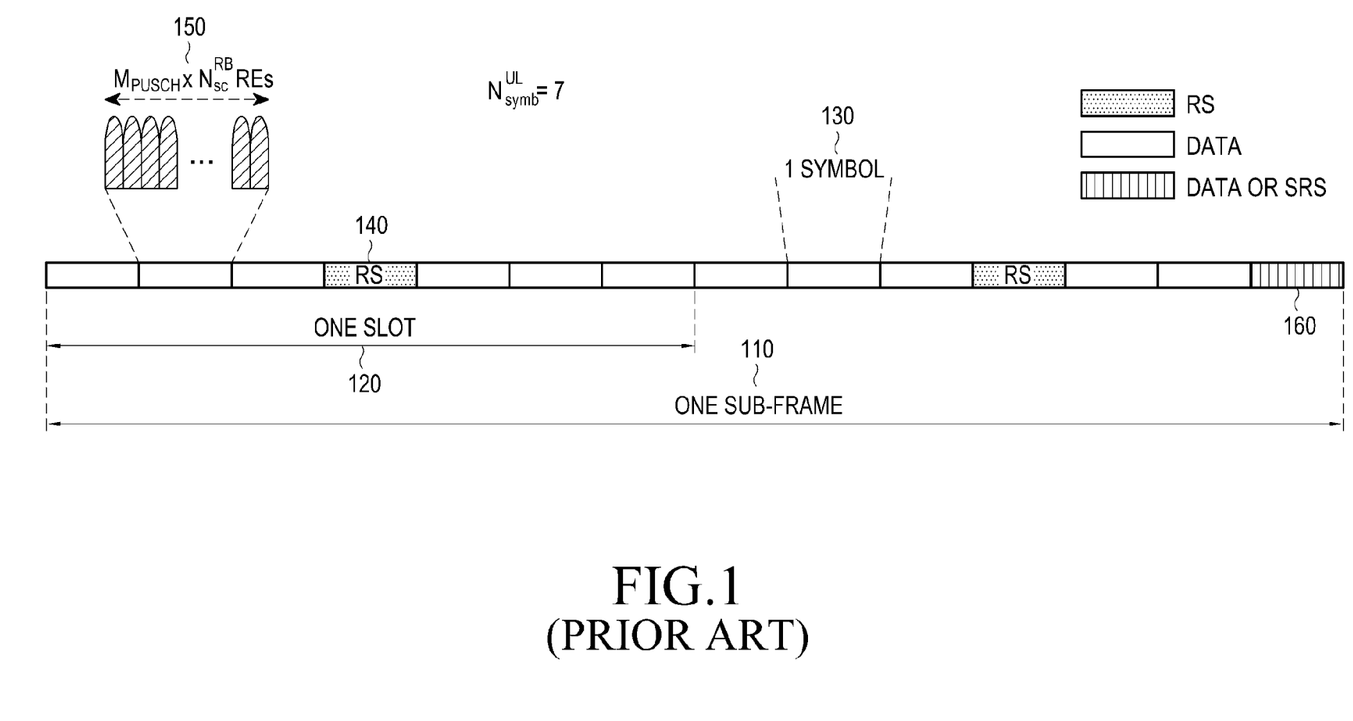
FIG. 1 is a diagram illustrating a PUSCH structure over a TTI.

FIG. 1 is a diagram illustrating a PUSCH structure over a Transmission Time Interval (TTI).

Referring to FIG. 1, a TTI consists of one subframe 110 that includes two slots 120. Each slot 120 includes $N_{symb}^{UL}$ symbols 130 for transmission of data information signals, UCI signals, or an RS. Some symbols in each slot are used to transmit a DM RS 140 that enables channel estimation and coherent demodulation of received data and/or UCI signals. The transmission BandWidth (BW) consists of frequency resource units, which are referred to as Resource Blocks (RBs). Each RB consists of $N_{sc}^{RB}$ sub-carriers, or Resource Elements (REs) and a UE is allocated $M_{PUSCH}$ RBs 150 for a total of $M_{sc}^{PUSCH} = M_{PUSCH} \cdot N_{sc}^{RB}$ REs for the PUSCH transmission BW.

The last subframe symbol may be used for transmission of an SRS 160 from one or more UEs. The SRS transmission parameters for a UE are configured by a NodeB through higher layer signaling, such as, for example, Radio Resource Control (RRC) signaling. The number of subframe symbols available for data transmission is $N_{symb}^{PUSCH} = 2 \cdot (N_{symb}^{UL} - 1) - N_{SRS}$, where $N_{SRS}=1$ if the last subframe symbol is used for SRS transmission, and otherwise $N_{SRS}=0$.

Figure 2:
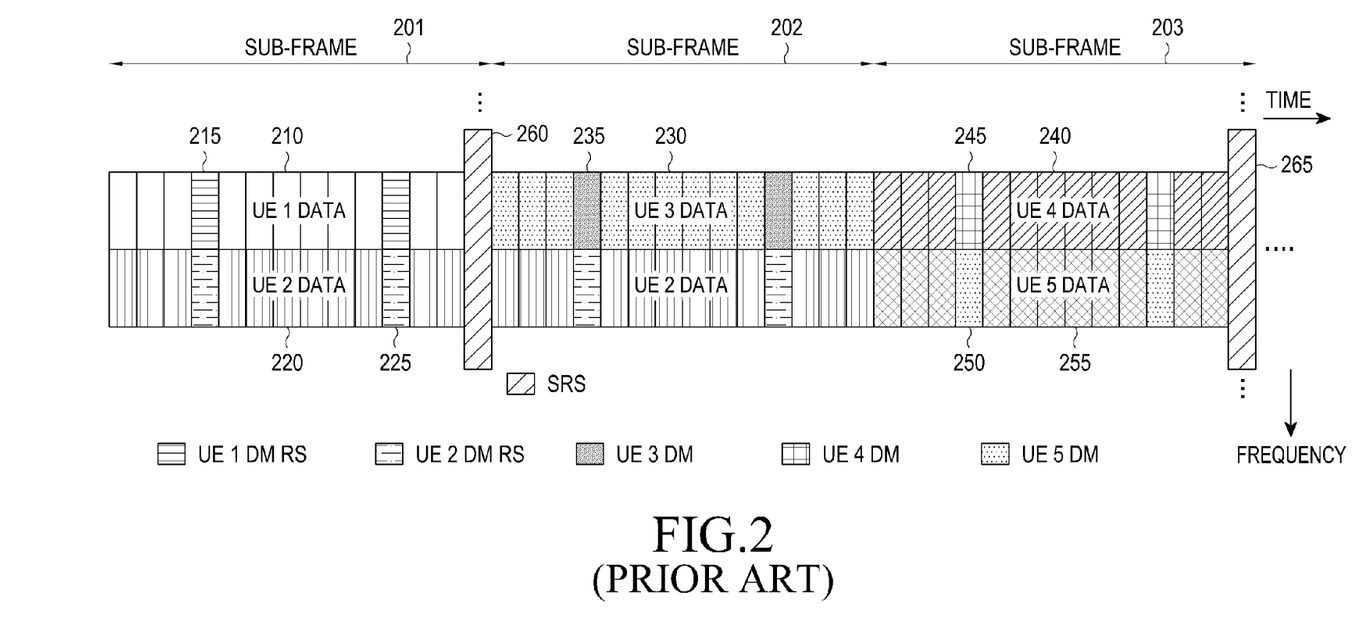
FIG. 2 is a diagram illustrating a configuration for SRS transmissions from multiple UEs.

FIG. 2 is a diagram illustrating a configuration for SRS transmissions from multiple UEs.

Referring to FIG. 2, an SRS transmission 260, 265 occurs in the last subframe symbol every 2 subframes 201, 203. PUSCH transmission of UE1 data 210 and UE2 data 220 are multiplexed in different BW parts during the first subframe 201, while the UE2 data 220 and UE3 data 230 are multiplexed during a second subframe 202, and UE4 data 240 and UE5 data 250 are multiplexed during a third subframe 203. In some symbols, UE1, UE2, UE3, UE4, and UE5 transmit DM RSs 215, 225, 235, 245, and 255, respectively. UEs with SRS transmissions may or may not have PUSCH transmissions in a same subframe and, if they co-exist in the same subframe, SRS and PUSCH transmission may be located at different parts of an operating BW.

A UE may transmit DMRS or SRS through the transmission of a respective Constant Amplitude Zero Auto-Correlation (CAZAC) sequence such as a Zadoff-Chu sequence. For a UL system BW consisting of $N_{RB}^{max,UL}$ RBs, a sequence $r_{u,v}^{(\alpha)}(n)$ can be defined by a Cyclic Shift (CS) $\alpha$ of a base sequence $\bar{r}_{u,v}(n)$ according to $r_{u,v}^{(\alpha)}(n) = e^{j\alpha n} \bar{r}_{u,v}(n)$, $0 \leq n \leq M_{sc}^{RS}$, where $M_{sc}^{RS} = mN_{sc}^{RB}$ is the length of the sequence, $1 \leq m \leq N_{RB}^{max,UL}$, and $\bar{r}_{u,v}(n) = x_q(n \bmod N_{ZC}^{RS})$ where the $q^{th}$ root Zadoff-Chu sequence is defined by $$x_q(m) = \exp\left(\frac{-j\pi q m(m+1)}{N_{ZC}^{RS}}\right),$$

$0 \leq m \leq N_{ZC}^{RS} - 1$ with q given by $q = \lfloor \bar{q} + \frac{1}{2} \rfloor + v \cdot (-1)^{\lfloor 2\bar{q} \rfloor}$ and $\bar{q}$ given by $\bar{q} = N_{ZC}^{RS} \cdot (u+1)/31$. The length $N_{ZC}^{RS}$ of the Zadoff-Chu sequence is given by the largest prime number such that $N_{ZC}^{RS} < M_{sc}^{RS}$. Multiple RS sequences can be defined from a single base sequence through different values of $\alpha$.

Figure 3:
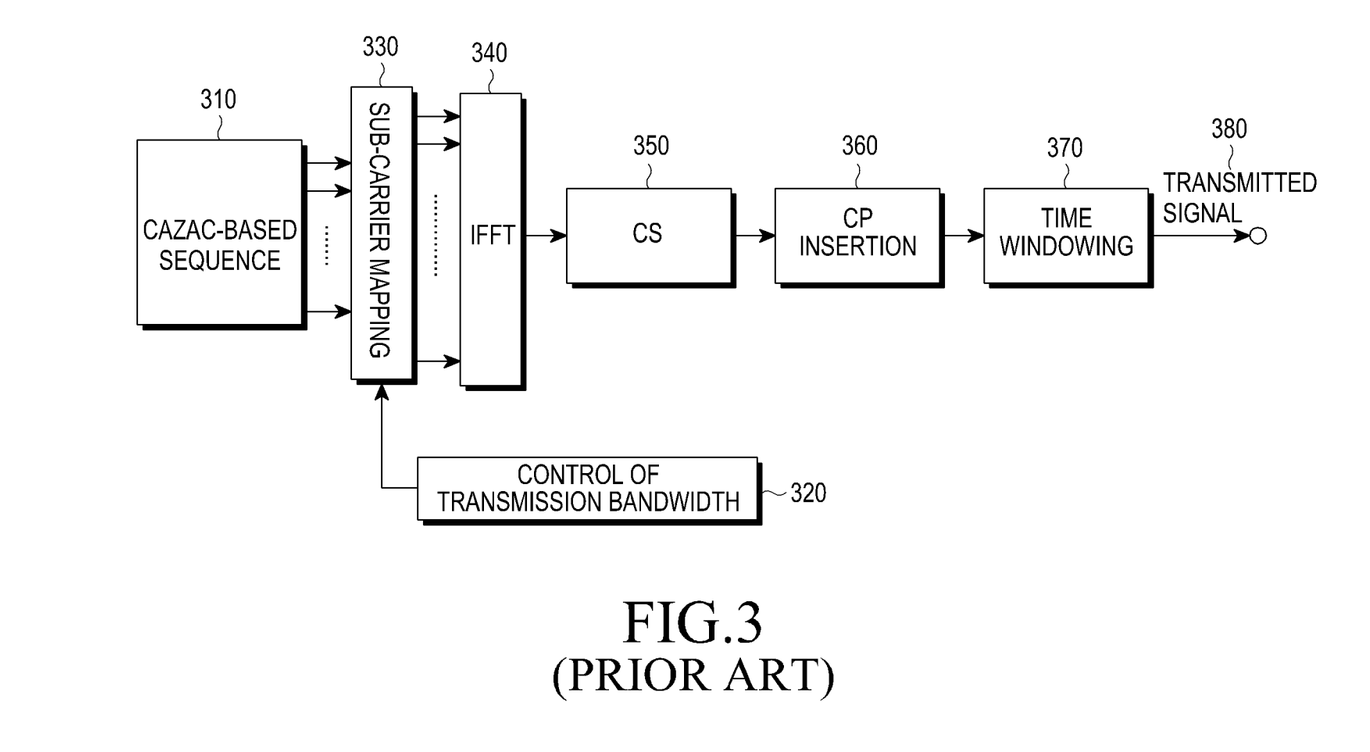
FIG. 3 is a block diagram illustrating an SRS transmitter structure at a UE.

FIG. 3 is a diagram illustrating an SRS transmitter structure at a UE.

Referring to FIG. 3, by choosing non-consecutive REs to a frequency domain version of a CAZAC sequence, a comb spectrum can be obtained which is useful for orthogonally multiplexing, in the same symbol, (through frequency division) SRS transmissions with unequal BWs. Such SRSs are constructed by CAZAC sequences of different lengths, which cannot be orthogonally separated using different CSs. An SRS transmitter 310 generates a frequency domain CAZAC sequence. A selector 320 selects REs in an assigned transmission BW (including non-consecutive REs in case of a comb spectrum) at a sub-carrier mapper 330. An Inverse Fast Fourier Transform (IFFT) unit 340 performs an IFFT. A CS 350 unit applies the CS. The resulting signal passes though a Cyclic Prefix (CP) unit 360 which inserts a CP, and a time windowing filter 370. The resulting signal 380 is transmitted. For brevity, though additional transmitter circuitry such as digital-to-analog converter, analog filters, amplifiers, and transmitter antennas may be included, they are not shown.

Figure 4:
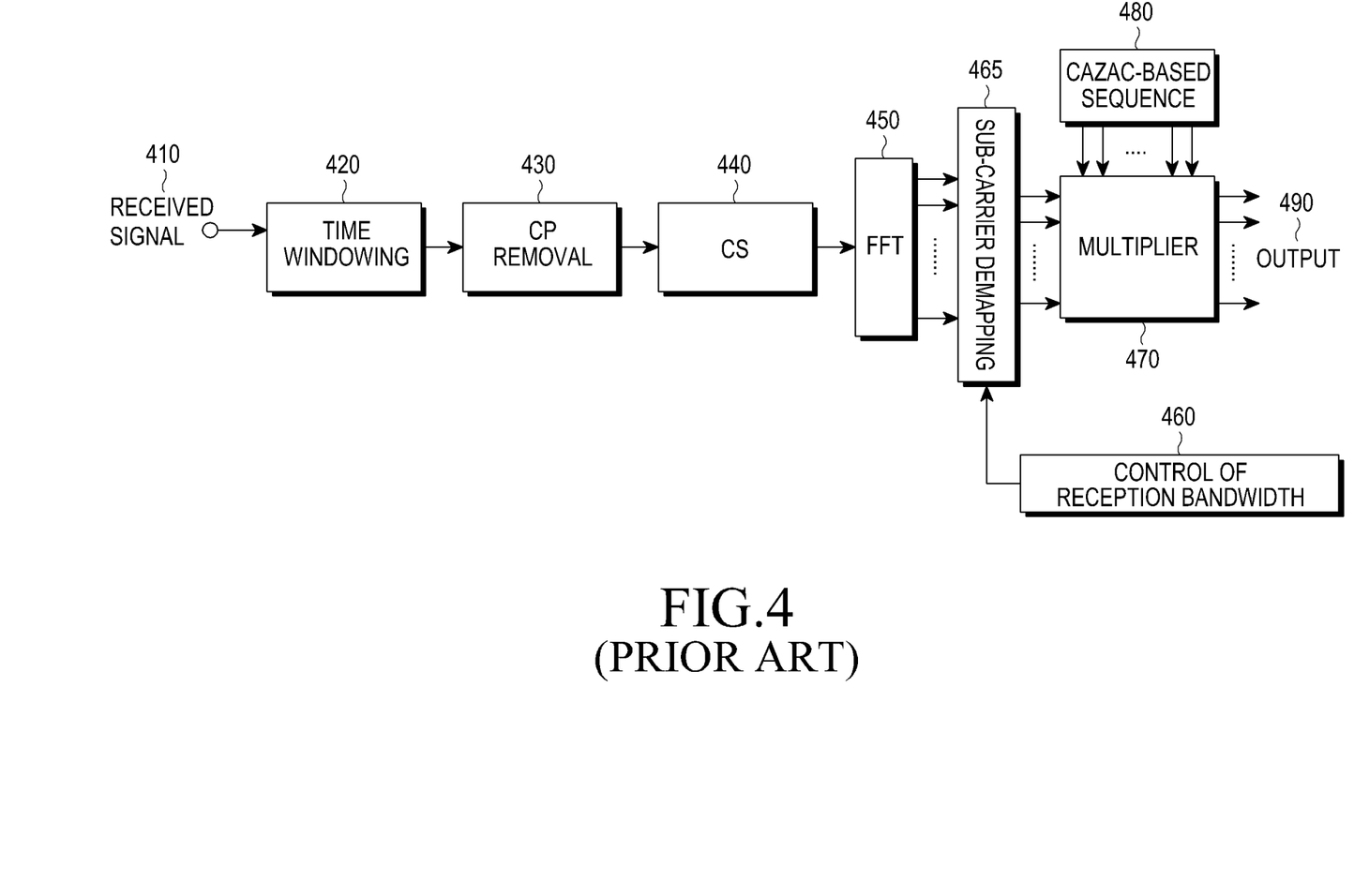
FIG. 4 is a block diagram illustrating an SRS receiver structure at a NodeB.

FIG. 4 is a diagram illustrating an SRS receiver structure at a NodeB.

Referring to FIG. 4, after an antenna receives a Radio-Frequency (RF) analog signal and after passing further processing units (such as filters, amplifiers, frequency down-converters, and analog-to-digital converters), a resulting signal 410 passes through a time-windowing filter 420 and a CP removal unit 430. Subsequently, a CS unit 440 removes a CS applied to a transmitted CAZAC sequence, a Fast Fourier Transform (FFT) unit 450 applies an FFT, a selector 460 selects received REs at a sub-carrier demapper 465, and a correlator 470 performs a correlation with a CAZAC sequence replica 480. Finally, output 490 can be passed to an UL channel estimator.

Several combinations for an SRS transmission BW can be supported as shown in Table 1. A NodeB may signal a configuration c through a broadcast channel, for example 3 bits can indicate one of eight configurations. The NodeB can then individually assign to each UE, for example using higher layer signaling of 2 bits, one of the possible SRS transmission BWs $m_{SRS,b}^c$ (in RBs) by indicating a value of b for configuration c. Therefore, the NodeB may assign any of the SRS transmission BWs $m_{SRS,0}^c$, $m_{SRS,1}^c$, $m_{SRS,2}^c$, and $m_{SRS,3}^c$ (b=0, b=1, b=2, and b=3, respectively, in Table 1) to a UE.

TABLE 1

Example of $m_{SRS,b}^c$ RB values for UL BW of $N_{RB}^{UL}$ RBs with $80 < N_{RB}^{UL} \leq 110$.

| SRS BW configuration | b = 0 | b = 1 | b = 2 | b = 3 |
|---|---|---|---|---|
| c = 0 | 96 | 48 | 24 | 4 |
| c = 1 | 96 | 32 | 16 | 4 |
| c = 2 | 80 | 40 | 20 | 4 |
| c = 3 | 72 | 24 | 12 | 4 |
| c = 4 | 64 | 32 | 16 | 4 |
| c = 5 | 60 | 20 | Not Applicable | 4 |
| c = 6 | 48 | 24 | 12 | 4 |
| c = 7 | 48 | 16 | 8 | 4 |

Figure 5:
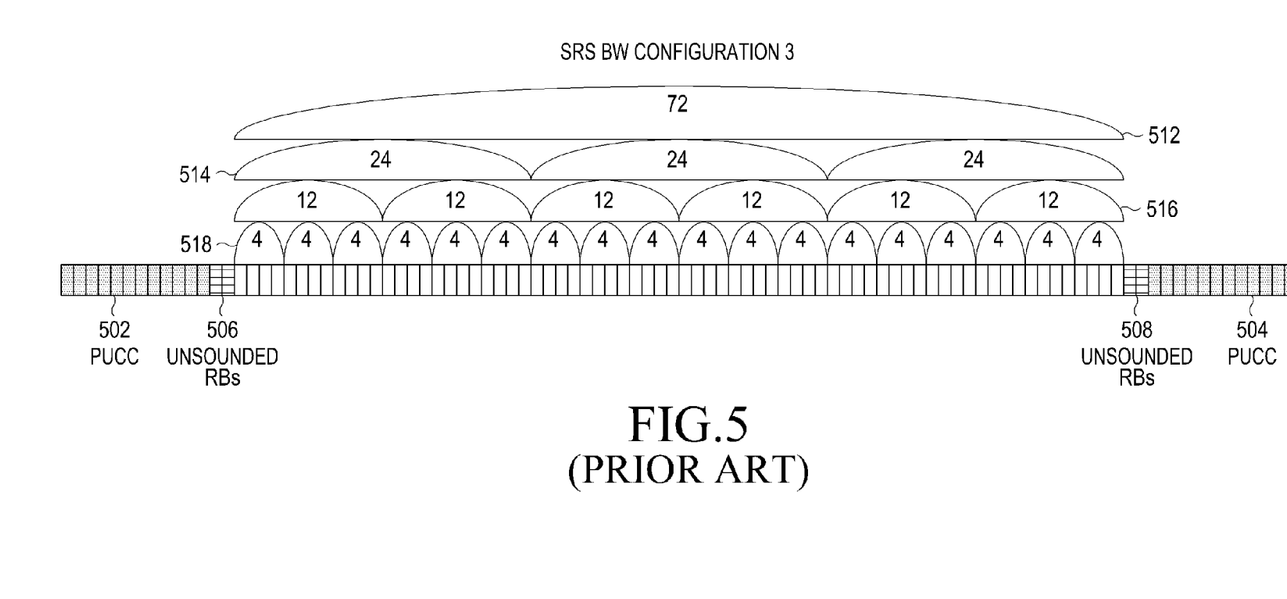
FIG. 5 is a diagram illustrating a structure for multiple SRS transmission BWs with configuration c=3 from Table 1.

FIG. 5 is a diagram illustrating a structure for multiple SRS transmission BWs with configuration c=3 from Table 1.

Referring to FIG. 5, PUCCH transmissions 502 and 504 are located at the two edges of an operating BW and a UE is configured SRS transmission BWs with $m_{SRS,0}^3$=72 RBs 512, $m_{SRS,1}^3$=24 RBs 514, $m_{SRS,2}^3$=12 RBs 516, or $m_{SRS,3}^3$=4 RBs 518. A few RBs, 506 and 508, may not be sounded, but a NodeB may still be able to schedule PUSCH transmissions in those RBs as a respective UL SINR may be interpolated from the nearest RBs with SRS transmission. For SRS BWs other than the maximum one, a NodeB is assumed to assign to a UE a starting BW position for an SRS transmission.

SRS transmissions can be periodic or aperiodic (dynamic). For periodic SRS transmissions, a NodeB configures the SRS transmission parameters for each UE through higher layer signaling, such as, for example, RRC signaling. Periodic SRS transmissions remain valid until re-configured, again through higher layer signaling. The periodic SRS transmission parameters may include an SRS BW, a comb, a CS, a starting BW position, a period (for example, one SRS transmission every 5 subframes), a starting subframe (for example, the first subframe in a set of subframes supporting SRS transmission), a number of UE transmitter antenna ports transmitting SRS, and a part of an operating BW an SRS transmission may hop. As periodic SRS transmissions are semi-statically configured, they may consume considerable UL resources, especially if they have a large transmission BW and need to be supported from multiple UE transmitter antenna ports. To dynamically control the UL resources allocated to SRS transmissions, aperiodic (dynamic) SRS transmissions can be utilized.

Aperiodic SRS transmissions are triggered by physical layer signaling (PDCCH) through some of the DCI formats that schedule PUSCH transmissions from a UE or PDSCH receptions to a UE. These DCI formats include an aperiodic SRS request field, which instructs a UE to transmit aperiodic SRS at a predetermined subsequent UL subframe relative to a DL subframe of the DCI format reception. For example, this UL subframe can be a first UL subframe supporting aperiodic SRS transmissions that occurs at least four TTIs after an UL subframe associated with a DL subframe of the DCI format transmission.

One or more sets of aperiodic SRS transmission parameters can be configured to a UE for each DCI format. An aperiodic SRS request field in a respective DCI format can indicate which set a UE should use for an aperiodic SRS transmission. The aperiodic SRS transmission parameters may be the same or a sub-set of the periodic SRS ones. For example, an aperiodic SRS transmission subframe may be uniquely determined, relative to a subframe of a respective DCI format reception, and an aperiodic SRS transmission may occur only once (no need to define a transmission period).

Table 2 shows an interpretation of an aperiodic SRS request field when it consists of 1 bit or when it consists of 2 bits. For one value of an aperiodic SRS request field, there is no aperiodic SRS transmission while the other values indicate aperiodic SRS transmission and a corresponding configuration of the aperiodic SRS transmission parameters.

TABLE 2

Aperiodic SRS request field operation.

| Aperiodic SRS Request Field - 1 Bit | Aperiodic SRS Request Field - 2 Bits |
|---|---|
| 0: No aperiodic SRS transmission | 00: No aperiodic SRS transmission |
| 1: Aperiodic SRS Transmission using configuration 0 | 01: Aperiodic SRS Transmission using configuration 1 |
| — | 10: Aperiodic SRS Transmission using configuration 2 |
| — | 11: Aperiodic SRS Transmission using configuration 3 |

Multiple DCI formats, each scheduling PDSCH or PUSCH for each of the potentially multiple transmission modes supported by a UE, may include an aperiodic SRS request field. Moreover, different DCI formats may be associated with different configurations of aperiodic SRS transmission parameters. The size of an aperiodic SRS request field (for example, 1 bit or 2 bits) can be different for different DCI formats. As a UE may receive multiple such DCI formats for which an aperiodic SRS transmission instance (PUSCH symbol in an UL subframe) is the same, a UE behavior in responding to respective multiple aperiodic SRS request fields needs to be determined so that proper operation can be achieved. Moreover, if a NodeB expects a UE to transmit an aperiodic SRS and a UE does not, unless a NodeB can perform reliable detection for the absence of an aperiodic SRS transmission, an estimate of a UL channel medium will be incorrect. This can adversely affect several subsequent scheduling decisions a NodeB may make for PUSCH transmission to the detriment of UL system throughput and communication quality with the particular UE.

SUMMARY OF THE INVENTION

The present invention has been made to address at least the above problems and/or disadvantages and to provide at least the advantages described below. Accordingly, an aspect of the present invention provides methods and apparatus for a UE to transmit an SRS in response to the reception of a DCI format providing an aperiodic SRS request field triggering an aperiodic SRS transmission with one configuration of transmission parameters from a set including one or more configurations.

In accordance with an embodiment of the present invention, a method for a UE to transmit an SRS is provided. A first DCI format with an aperiodic SRS request field indicating aperiodic SRS transmission with first values for aperiodic SRS transmission parameters, is received. A second DCI format with an aperiodic SRS request field indicating aperiodic SRS transmission with second values for the aperiodic SRS transmission parameters, is received. The first values for the aperiodic SRS transmission parameters are compared with the second values for the aperiodic SRS transmission parameters. An aperiodic SRS is transmitted when the first values are identical to the second values. Transmission of the aperiodic SRS is suspended when the first values are not identical to the second values.

In accordance with another embodiment of the present invention, a method for a UE to transmit an SRS is provided. A first number of DCI formats and a second number of DCI formats are received. Each of the first number of DCI formats conveys an aperiodic SRS request field indicating aperiodic SRS transmission and values for aperiodic SRS transmission parameters. Each of the second number of DCI formats conveys an aperiodic SRS request field indicating no aperiodic SRS transmission. The values for the aperiodic SRS transmission parameters indicated by the aperiodic SRS request fields of each of the first number of DCI formats are compared. The aperiodic SRS request field in each of the second number of DCI formats are disregarded. An aperiodic SRS is transmitted, when all of the values for the aperiodic SRS transmission parameters indicated by the aperiodic SRS request fields of each of the first number of DCI formats are identical. Transmission of the aperiodic SRS is suspended, when all of the values for the aperiodic SRS transmission parameters indicated by the aperiodic SRS request fields of each of the first number of DCI formats are not identical.

In accordance with an additional aspect of the present invention, a UE apparatus is provided for transmitting an SRS. The UE apparatus includes a receiver for receiving a first Downlink Control Information (DCI) format with an aperiodic SRS request field indicating aperiodic SRS transmission with first values for aperiodic SRS transmission parameters, and a second DCI format with an aperiodic SRS request field indicating aperiodic SRS transmission with second values for the aperiodic SRS transmission parameters. The UE apparatus also includes a comparator for comparing the first values for the aperiodic SRS transmission parameters with the second values for the aperiodic SRS transmission parameters. The UE apparatus further includes a transmitter for transmitting an aperiodic SRS when the first values are identical to the second values and for suspending transmission of the aperiodic SRS when the first values are not identical to the second values.

In accordance with a further aspect of the present invention, a UE apparatus is provided for transmitting an SRS. The UE apparatus includes a receiver for receiving a first number of Downlink Control Information (DCI) formats and a second number of DCI formats. Each of the first number of DCI formats conveys an aperiodic SRS request field indicating aperiodic SRS transmission and values for aperiodic SRS transmission parameters. Each of the second number of DCI formats conveys an aperiodic SRS request field indicating no aperiodic SRS transmission. The UE apparatus also includes a comparator for comparing the values for the aperiodic SRS transmission parameters indicated by the aperiodic SRS request fields of each of the first number of DCI formats, and disregarding the aperiodic SRS request field in each of the second number of DCI formats. The UE apparatus further includes a transmitter for transmitting an aperiodic SRS when all of the values for the aperiodic SRS transmission parameters indicated by the aperiodic SRS request fields of each of the first number of DCI formats are identical, and suspending transmission of the aperiodic SRS when all of the values for the aperiodic SRS transmission parameters indicated by the aperiodic SRS request fields of each of the first number of DCI formats are not identical.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Embodiments of the present invention are described in detail with reference to the accompanying drawings. The same or similar components may be designated by the same or similar reference numerals although they are illustrated in the different drawings. Detailed descriptions of constructions or processes known in the art may be omitted to avoid obscuring the subject matter of the present invention.

Additionally, although embodiments of the present invention will be described below with reference to DFT-spread OFDM transmission, they also are applicable to all Frequency Division Multiplexing (FDM) transmissions in general and to Single-Carrier Frequency Division Multiple Access (SC-FDMA) and OFDM in particular.

An embodiment of the present invention considers that a UE receives multiple DCI formats indicating aperiodic SRS transmission at the same UL subframe symbol.

Figure 6:
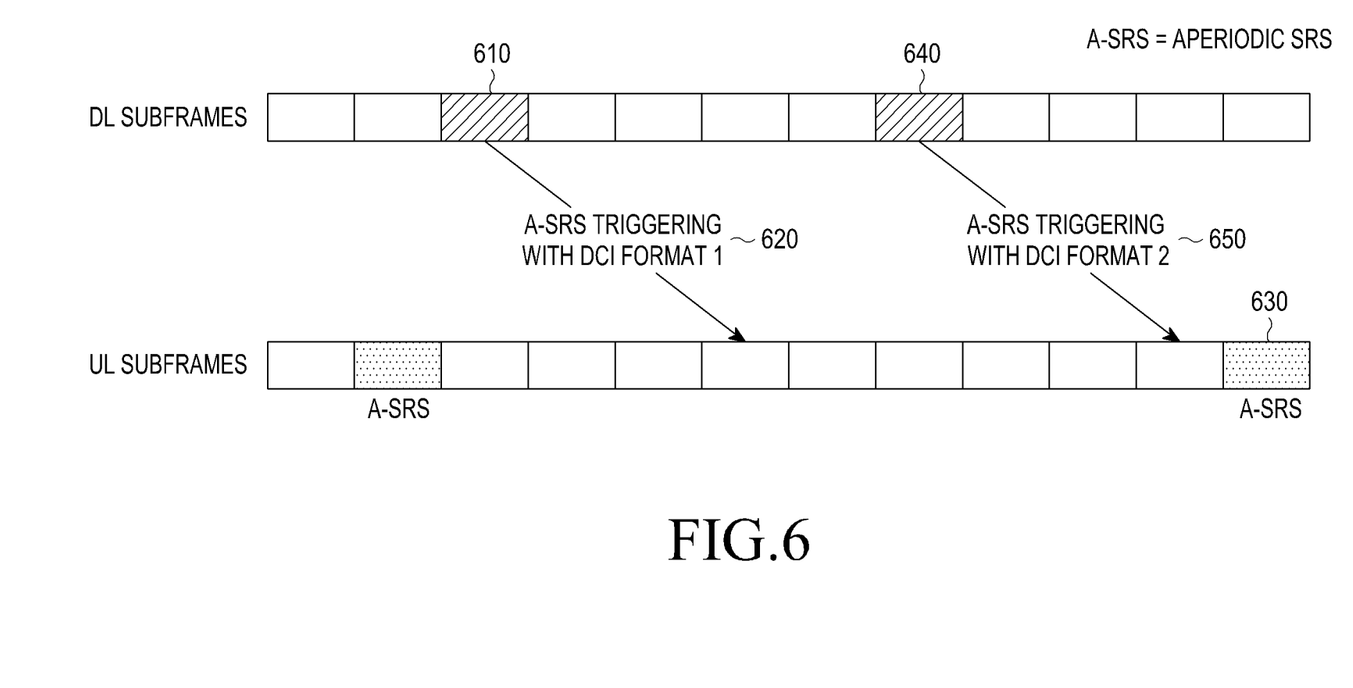
FIG. 6 is a diagram illustrating a reception of multiple DCI formats, in respective multiple subframes, triggering an aperiodic SRS, according to an embodiment of the present invention.

FIG. 6 is a diagram illustrating reception of multiple DCI formats, in respective multiple subframes, triggering aperiodic SRS, according to an embodiment of the present invention.

Referring to FIG. 6, a UE receives a first DCI format 620 in a first DL subframe 610 triggering aperiodic SRS transmission in an UL subframe 630 and a second DCI format 650 in a second DL subframe 640 triggering aperiodic SRS transmission in the same UL subframe 630 (and same symbol of the UL subframe, such as, for example, the last symbol). UL subframes prior to the UL subframe 630, at which the UE could potentially transmit aperiodic SRS, are assumed to not support aperiodic SRS transmission. Therefore, the UE needs to wait for the UL subframe 630 in order to transmit aperiodic SRS. The first DCI format, the DCI format 1 620, and the second DCI format, the DCI format 2 650, do not necessarily correspond to different DCI formats, but can also correspond to the same DCI format transmitted in different DL subframes.

If the first DCI format 620 and the second DCI format 650 convey different aperiodic SRS configurations, specifically, aperiodic SRS configurations with different aperiodic SRS transmission parameters, a NodeB and a UE will have a different understanding of the aperiodic SRS transmission parameters if the UE misses (or incorrectly receives) the second DCI format 650.

The second DCI format 650 is assumed to be the last DCI format with the aperiodic SRS request that is transmitted to the UE in a DL subframe for which the aperiodic SRS transmission will occur in the UL subframe 630. The consequences of this misunderstanding are that a UE will transmit the aperiodic SRS with parameters that differ from those assumed by a NodeB, and the aperiodic SRS transmission will interfere with one from another UE (for example, if the CS is the same). A NodeB will therefore observe noise at the expected resources for the aperiodic SRS transmission from a reference UE, since the UE uses a different set of aperiodic SRS transmission parameters. The NodeB will obtain a corrupted UL channel medium estimate for the interfered UE. Both of these events can result in an inaccurate estimation of the UL channel mediums for the interfering and the interfered UEs, and inaccurate decisions by a NodeB for scheduling PUSCH transmissions from these UEs, to the detriment of UL system throughput and communication quality experienced at the UE.

Therefore, if a UE receives multiple aperiodic SRS requests for aperiodic SRS transmissions with different parameters at a same aperiodic SRS transmission instance, the UE should ignore all of the aperiodic SRS requests since it can be attributed to inaccurate NodeB operation or false detection of at least one respective DCI format.

Conversely, if the first DCI format 620 and the second DCI format 650 convey the same aperiodic SRS configurations, specifically, aperiodic SRS configurations with the same aperiodic SRS transmission parameters, the UE should consider the respective SRS requests as valid and should perform aperiodic SRS transmission in the UL subframe 630 using the parameters of the configuration indicated by the aperiodic SRS request fields in the respective DCI formats.

The benefit of indicating aperiodic SRS transmission when multiple DCI formats are transmitted to the UE and convey the same configuration for aperiodic SRS transmission in a same subframe is that even if the UE misses some of these DCI formats, it can still transmit the aperiodic SRS using the same parameters as the those expected by a NodeB. Therefore, if a NodeB does not need to blindly detect whether a UE is transmitting an aperiodic SRS, the probability that the NodeB estimates an UL channel medium for the UE based on an actual aperiodic SRS transmission is increased. Moreover, the probability that the aperiodic SRS resources allocated to a UE are not wasted due to a missed DCI format is also increased.

Therefore, an embodiment of the present invention considers that if a UE receives multiple aperiodic SRS requests, in respectively multiple DCI formats, corresponding to the same configuration of aperiodic SRS transmission parameters at a given aperiodic SRS transmission instance, the UE transmits the aperiodic SRS. Otherwise, if a UE receives multiple aperiodic SRS requests, in respectively multiple DCI formats, corresponding to different configurations of aperiodic SRS transmission parameters at a given aperiodic SRS transmission instance, the UE does not transmit any aperiodic SRS.

Figure 7:
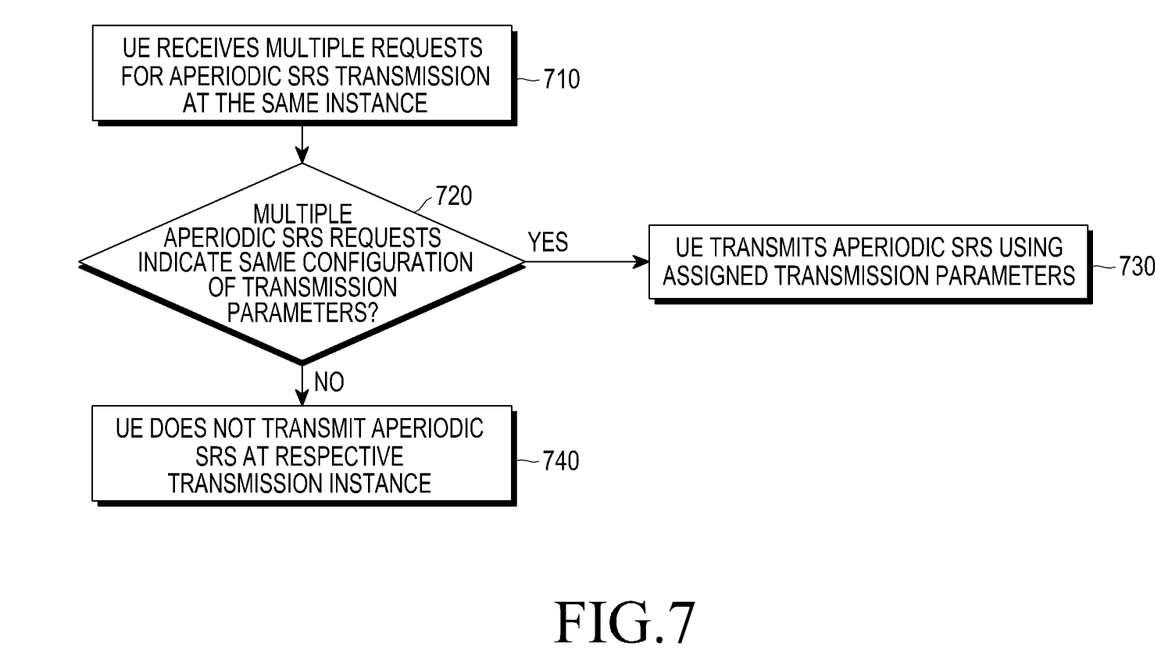
FIG. 7 is a diagram illustrating a UE transmitter process in response to multiple DCI formats indicating aperiodic SRS transmission at the same aperiodic SRS transmission instance, according to an embodiment of the present invention.

FIG. 7 is a diagram illustrating a UE transmitter process in response to multiple DCI formats indicating aperiodic SRS transmission at a same aperiodic SRS transmission instance, according to an embodiment of the present invention.

Referring to FIG. 7, a UE receives multiple DCI formats indicating aperiodic SRS transmission at a same aperiodic SRS transmission instance, in step 710. In order to determine whether to transmit an aperiodic SRS, the UE determines whether the multiple aperiodic SRS requests indicate the same configuration (values) of aperiodic SRS transmission parameters at a corresponding aperiodic SRS transmission instance, in step 720. When the multiple aperiodic SRS requests indicate the same configuration of transmission parameters, the UE transmits the aperiodic SRS, using, for example, the structure in FIG. 3, using the assigned values for the aperiodic SRS transmission parameters, in step 730. When the multiple aperiodic SRS requests do not indicate the same configuration of transmission parameters, the UE does not transmit any aperiodic SRS at a respective transmission instance, in step 740.

Another embodiment of the present invention considers that a UE receives multiple DCI formats that may indicate triggering of an aperiodic SRS transmission at the same UL subframe symbol (i.e., the same aperiodic SRS transmission instance), but the aperiodic SRS request field in at least one of these DCI formats indicates that the aperiodic SRS should not be transmitted.

Figure 8:
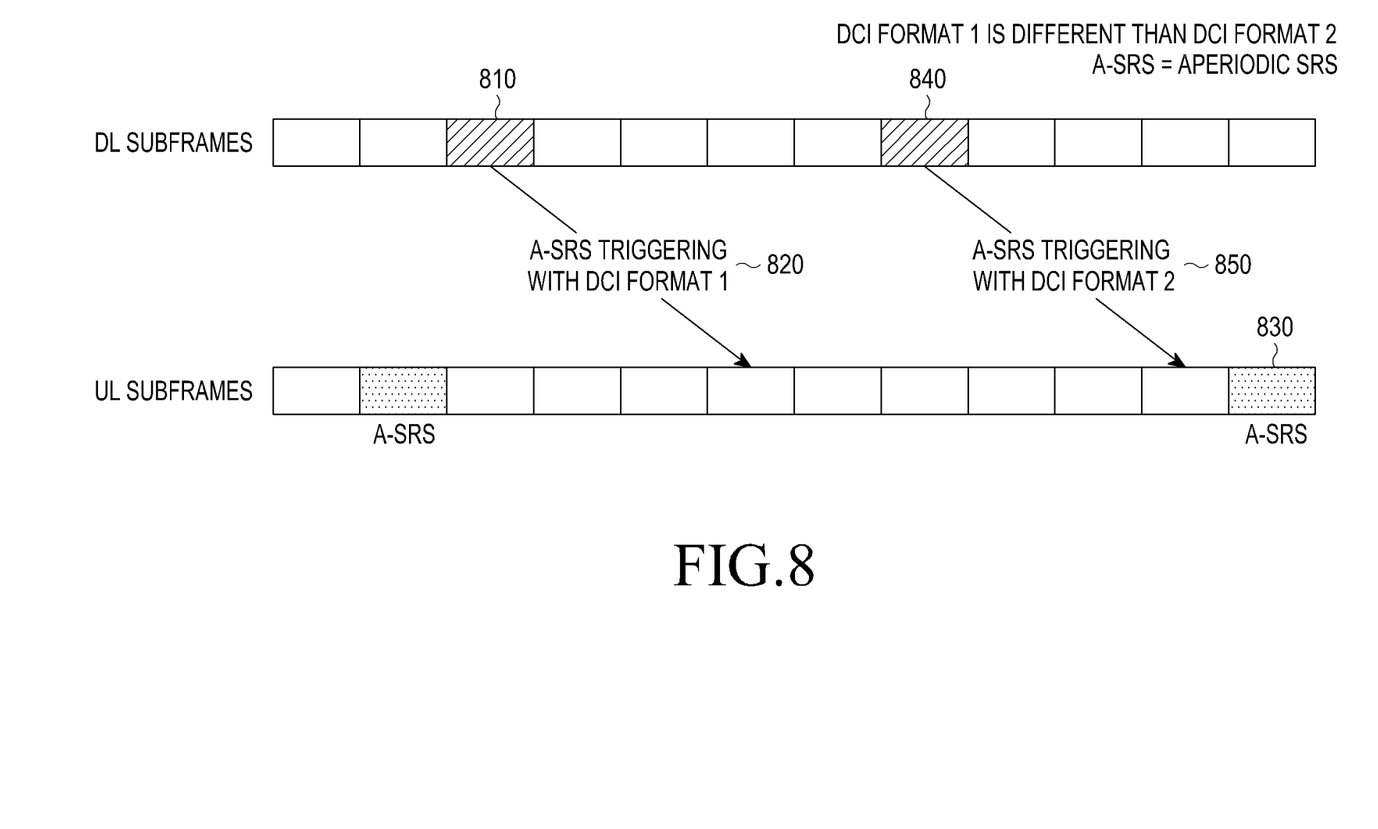
FIG. 8 is a diagram illustrating a reception of two DCI formats, in respective subframes, with a first DCI format indicating triggering of an aperiodic SRS and a second DCI format indicating no triggering of an aperiodic SRS, according to an embodiment of the present invention.

FIG. 8 is a diagram illustrating the reception of two DCI formats, in respective subframes, with a first DCI format indicating the triggering of aperiodic SRS and a second DCI format indicating no triggering of aperiodic SRS, according to an embodiment of the present invention.

Referring to FIG. 8, a UE receives a first DCI format 820 in a first DL subframe 810 that triggers aperiodic SRS transmission in an UL subframe 830, and a second DCI format 850 in a second DL subframe 840 that does not trigger aperiodic SRS transmission in the same UL subframe 830 (and same symbol of the UL subframe). UL subframes prior to the UL subframe 830, at which the UE could potentially transmit aperiodic SRS, are assumed to not support aperiodic SRS transmission, and therefore the UE needs to wait for the UL subframe 830 in order to transmit the aperiodic SRS. Also, considering the previous embodiment of the present invention described above, the DCI format 1 820 and the DCI format 2 850 do need to correspond to different DCI formats and they cannot correspond to the same DCI format transmitted in different DL subframes. Moreover, although FIG. 8 illustrates that the second DCI format 850 is received after the first DCI format 820, the reverse can also apply.

In order to avoid any ambiguity and operate the system as described in the previous embodiment of the present invention, instead of indicating no aperiodic SRS transmission, it is feasible for the second DCI format 850 to indicate aperiodic SRS transmission using the same parameters as the first DCI format 820 at a same aperiodic SRS transmission instance. However, in order to improve the flexibility in allocating aperiodic SRS resources, it should be possible to convey different configurations for aperiodic SRS transmission parameters in different DCI formats. The indication of aperiodic SRS transmission using the same parameters from two different DCI formats is not possible. Therefore, if a UE receives, in a DCI format, a request for aperiodic SRS transmission at a given aperiodic SRS transmission instance, the UE should transmit the aperiodic SRS even if it receives, in different DCI formats, a request indicating no aperiodic SRS transmission at the given aperiodic SRS transmission instance. The only occasion where a UE should not transmit the aperiodic SRS, even when it receives multiple requests to do so at a same aperiodic SRS transmission instance, is described above in the previous embodiment of the present invention.

Therefore, this embodiment of the present invention considers that if a UE receives DCI formats indicating aperiodic SRS transmissions with the same parameters at an aperiodic SRS transmission instance and also receives other DCI formats indicating no aperiodic SRS transmission at the same aperiodic SRS transmission instance, the UE transmits the aperiodic SRS with the indicated parameters at the aperiodic SRS transmission instance.

Figure 9:
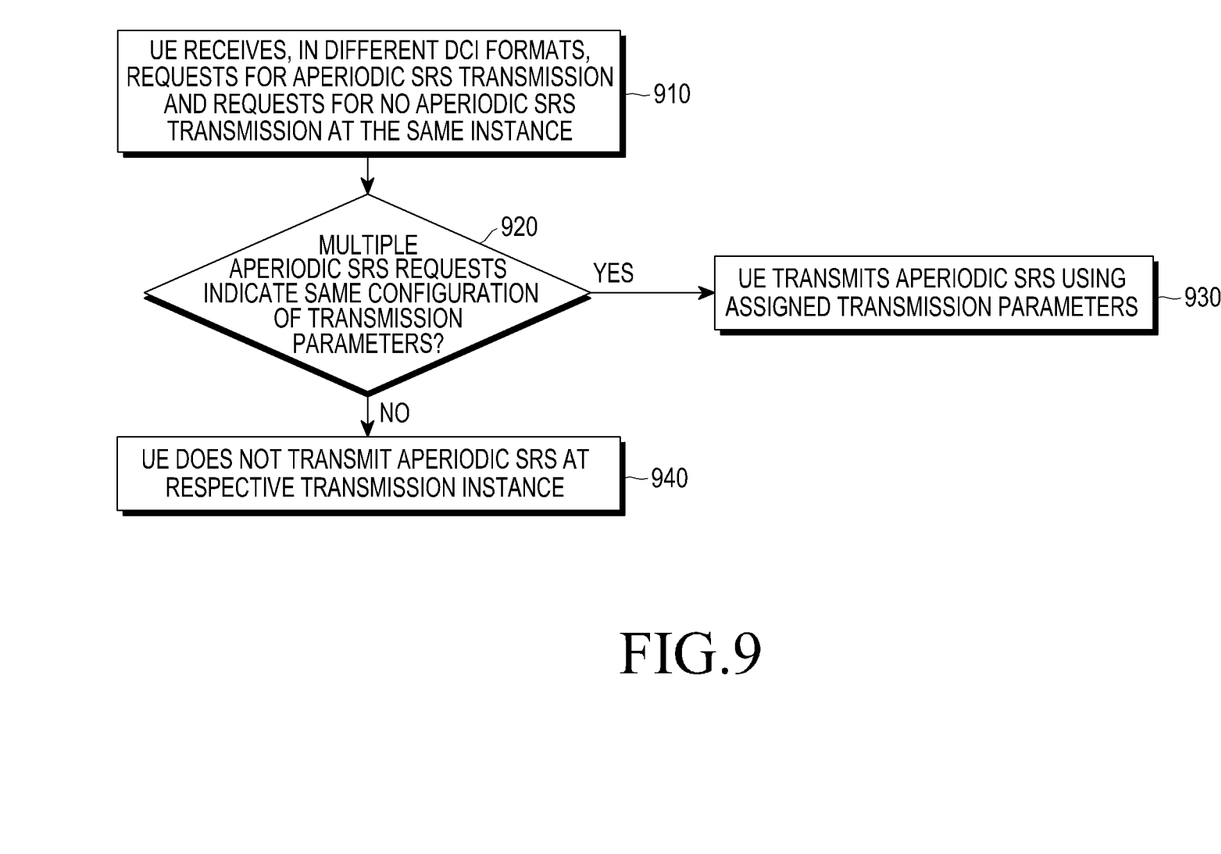
FIG. 9 is a diagram illustrating a UE transmitter process in response to at least one DCI format indicating aperiodic SRS transmission and at least one, different, DCI format indicating no aperiodic SRS transmission at the same aperiodic SRS transmission instance, according to an embodiment of the present invention.

FIG. 9 is a diagram illustrating a UE transmitter process in response to at least one DCI format indicating aperiodic SRS transmission and at least one, different, DCI format indicating no aperiodic SRS transmission at the same aperiodic SRS transmission instance, according to an embodiment of the present invention.

Referring to FIG. 9, a UE receives at least one first DCI format indicating aperiodic SRS transmission and at least one second DCI format, that is different from the at least one first DCI format, indicating no aperiodic SRS transmission at the same aperiodic SRS transmission instance, in step 910. A UE ignores the request for no aperiodic SRS transmission and, when multiple DCI formats indicate aperiodic SRS transmission, the UE processing proceeds as described in FIG. 7. Therefore, a UE determines all aperiodic SRS request fields indicate the same configuration of aperiodic SRS transmission parameters at a corresponding aperiodic SRS transmission instance, in step 920. When all aperiodic SRS request fields indicate the same configuration of transmission parameters, the transmits the aperiodic SRS, using, for example, the structure in FIG. 3, using the assigned transmission parameters, in step 930. When all aperiodic SRS request fields do not indicate the same configuration of transmission parameters, the UE does not transmit any aperiodic SRS at the respective transmission instance, in step 940.

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for a User Equipment (UE) to transmit a Sounding Reference Signal (SRS), the method comprising the steps of:
   receiving a first Downlink Control Information (DCI) format with an aperiodic SRS request field indicating aperiodic SRS transmission with first values for aperiodic SRS transmission parameters;
   receiving a second DCI format with an aperiodic SRS request field indicating aperiodic SRS transmission with second values for the aperiodic SRS transmission parameters;
   comparing the first values for the aperiodic SRS transmission parameters with the second values for the aperiodic SRS transmission parameters; and
   transmitting an aperiodic SRS when the first values are identical to the second values; and
   suspending transmission of the aperiodic SRS when the first values are not identical to the second values.

2. The method of claim 1, wherein the aperiodic SRS request field in the first DCI format is represented by a first number of bits and indicates the aperiodic SRS transmission parameters from a first set of aperiodic SRS transmission parameters, and wherein the aperiodic SRS request field in the second DCI format is represented by a second number of bits and indicates the aperiodic SRS transmission parameters from a second set of aperiodic SRS transmission parameters.

3. The method of claim 1, wherein the first DCI format and the second DCI format are received in different transmission time intervals.

4. The method of claim 1, wherein the aperiodic SRS transmission parameters are configured to the UE from a network through higher layer signaling and comprise at least one of a transmission comb, a cyclic shift, a starting position in an operating bandwidth, a transmission bandwidth, a transmission instance, and a number of UE transmitter antenna ports.

5. A method for a User Equipment (UE) to transmit a Sounding Reference Signal (SRS), the method comprising the steps of:
   receiving a first number of Downlink Control Information (DCI) formats and a second number of DCI formats, wherein each of the first number of DCI formats conveys an aperiodic SRS request field indicating aperiodic SRS transmission and values for aperiodic SRS transmission parameters, and wherein each of the second number of DCI formats conveys an aperiodic SRS request field indicating no aperiodic SRS transmission;
   comparing the values for the aperiodic SRS transmission parameters indicated by the aperiodic SRS request fields of each of the first number of DCI formats;
   disregarding the aperiodic SRS request field in each of the second number of DCI formats;
   transmitting an aperiodic SRS, when all of the values for the aperiodic SRS transmission parameters indicated by the aperiodic SRS request fields of each of the first number of DCI formats are identical; and
   suspending transmission of the aperiodic SRS, when all of the values for the aperiodic SRS transmission parameters indicated by the aperiodic SRS request fields of each of the first number of DCI formats are not identical.

6. The method of claim 5, wherein the aperiodic SRS request field in a first DCI format from the first number of DCI formats or from the second number of DCI formats is represented by a first number of bits and indicates the aperiodic SRS transmission parameters from a first set of aperiodic SRS transmission parameters, and wherein the aperiodic SRS request field in a second DCI format from the first number of DCI formats or from the second number of DCI formats is represented by a second number of bits and indicates the aperiodic SRS transmission parameters from a second set of aperiodic SRS transmission parameters.

7. The method of claim 5, wherein a first DCI format and a second DCI format from the first number of DCI formats or from the second number of DCI formats are received in different transmission time intervals.

8. The method of claim 5, wherein the aperiodic SRS transmission parameters are configured to the UE from a network through higher layer signaling and comprise at least one of a transmission comb, a cyclic shift, a starting position in an operating bandwidth, a transmission bandwidth, a transmission instance, and a number of UE transmitter antenna ports.

9. A User Equipment (UE) apparatus for transmitting a Sounding Reference Signal (SRS), the UE apparatus comprising:
    a receiver for receiving a first Downlink Control Information (DCI) format with an aperiodic SRS request field indicating aperiodic SRS transmission with first values for aperiodic SRS transmission parameters, and a second DCI format with an aperiodic SRS request field indicating aperiodic SRS transmission with second values for the aperiodic SRS transmission parameters;
    a comparator for comparing the first values for the aperiodic SRS transmission parameters with the second values for the aperiodic SRS transmission parameters; and
    a transmitter for transmitting an aperiodic SRS when the first values are identical to the second values and for suspending transmission of the aperiodic SRS when the first values are not identical to the second values.

10. The UE apparatus of claim 9, wherein the aperiodic SRS request field in the first DCI format is represented by a first number of bits and indicates the aperiodic SRS transmission parameters from a first set of aperiodic SRS transmission parameters, and wherein the aperiodic SRS request field in the second DCI format is represented by a second number of bits and indicates the aperiodic SRS transmission parameters from a second set of aperiodic SRS transmission parameters.

11. The UE apparatus of claim 9, wherein the first DCI format and the second DCI format are received in different transmission time intervals.

12. The UE apparatus of claim 9, wherein the aperiodic SRS transmission parameters are configured to the UE apparatus from a network through higher layer signaling and comprise at least one of a transmission comb, a cyclic shift, a starting position in an operating bandwidth, a transmission bandwidth, a transmission instance, and a number of UE transmitter antenna ports.

13. A User Equipment (UE) apparatus for transmitting a Sounding Reference Signal (SRS), the UE apparatus comprising:
    a receiver for receiving a first number of Downlink Control Information (DCI) formats and a second number of DCI formats, wherein each of the first number of DCI formats conveys an aperiodic SRS request field indicating aperiodic SRS transmission and values for aperiodic SRS transmission parameters, and wherein each of the second number of DCI formats conveys an aperiodic SRS request field indicating no aperiodic SRS transmission;
    a comparator for comparing the values for the aperiodic SRS transmission parameters indicated by the aperiodic SRS request fields of each of the first number of DCI formats, and disregarding the aperiodic SRS request field in each of the second number of DCI formats; and
    a transmitter for transmitting an aperiodic SRS when all of the values for the aperiodic SRS transmission parameters indicated by the aperiodic SRS request fields of each of the first number of DCI formats are identical, and suspending transmission of the aperiodic SRS when all of the values for the aperiodic SRS transmission parameters indicated by the aperiodic SRS request fields of each of the first number of DCI formats are not identical.

14. The apparatus of claim 13, wherein the aperiodic SRS request field in a first DCI format from the first number of DCI formats or from the second number of DCI formats is represented by a first number of bits and indicates the aperiodic SRS transmission parameters from a first set of aperiodic SRS transmission parameters, and wherein the aperiodic SRS request field in a second DCI format from the first number of DCI formats or from the second number of DCI formats is represented by a second number of bits and indicates the aperiodic SRS transmission parameters from a second set of aperiodic SRS transmission parameters.

15. The apparatus of claim 13, wherein a first DCI format and a second DCI format from the first number of DCI formats or the second number of DCI formats are received in different transmission time intervals.

16. The apparatus of claim 13, wherein the aperiodic SRS transmission parameters are configured to the UE from a network through higher layer signaling and comprise at least one of a transmission comb, a cyclic shift, a starting position in an operating bandwidth, a transmission bandwidth, a transmission instance, and a number of UE transmitter antenna ports.

* * * * *